United States Patent Office 3,790,676
Patented Feb. 5, 1974

3,790,676
PREVENTING PAIN, FEVER AND INFLAMMATION WITH CYCLIC HYDROXY SULFOXIDES
Lewis H Sarett, Princeton, Tsung-Ying Shen, Westfield, and Conrad P. Dorn, Jr., Plainfield, N.J., assignors to Merck & Co., Inc., Rahway, N.J.
No Drawing. Application May 22, 1969, Ser. No. 827,044, which is a continuation-in-part of application Ser. No. 476,676, Aug. 2, 1965, both now abandoned. Divided and this application Sept. 20, 1971, Ser. No. 182,131
Int. Cl. A61k 27/00
U.S. Cl. 424—275         3 Claims

ABSTRACT OF THE DISCLOSURE

Pharmaceutical compositions having as an active ingredient hydroxy sulfoxides. These compositions ar useful as anti-inflammatory compounds, cryoprotectants and skin penetrants. Also included are method of treatment claims.

---

This application is a division of copending application Ser. No. 827,044 filed May 22, 1969, now abandoned, which was in turn a continuation-in-part of application Ser. No. 476,676 filed Aug. 2, 1965, now abandoned.

This invention relates to certain sulfoxides and to their pharmaceutical and related use, including novel pharmaceutical compositions containing such sulfoxides as an active ingredient. In addition, this invention relates to the preparation of these sulfoxides and their pharmaceutical compositions.

The sulfoxides of this invention represent a new series of compounds in the continuing search for potent anti-inflammatory agents. In addition to such anti-inflammatory activity (which, as used herein includes antipyretic and analgesic potency), the novel sulfoxide pharmaceutical compositions of this invention exhibit a wide variety of other pharmaceutical uses.

It is an object of this invention to provide a method of treatment of inflammation and associated pain and fever. It is also an object of this invention to provide analgesic and antipyretic methods for the relief and treatment of pain and fever not symptomatically related to an inflammatory indication. Another object is to provide an entirely new class of anti-inflammatory analgesic and antipyretic compositions.

It is also an object of this invention to provide methods for the treatment of various other disease conditions or symptoms, as more fully described hereinafter, by the administration in pharmaceutically acceptable form, of the sulfoxides of this invention.

It is also an object of this invention to provide novel pharmaceutical compositions containing these sulfoxides as an active ingredient. A still further object is to provide methods for the prepration of these sulfoxides and also, to provide means and methods for the formulation of the novel pharmaceutical compositions containing the same. In addition, it is an object of this invention to provide a novel pharmaceutical carrier or vehicle comprising the sulfoxides of this invention.

The above and other objects of this invention are accomplished by the administration in dosage unit form of a pharmaceutically acceptable composition containing a therapeutically effective amount of a symmetrical, or unsymmetrical, hydroxy hydrocarbyl sulfoxide, or of a cyclic hydroxy alkylene sulfoxide, wherein said hydroxy is preferably substituted at a position other than $\alpha$ to the sulfoxide moiety, such as methyl hydroxyethyl sulfoxide, 3-hydroxy tetramethylene sulfoxide, methyl $\beta$-hydroxy isopropyl sulfoxide, methyl $\beta,\gamma$-dihydroxypropyl sulfoxide.

The sulfoxides of this invention can be represented by the following formula:

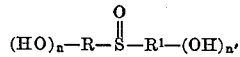

wherein R and $R^1$ are hydrocarbon groups, which can be the same or different, generally contain about 1–10 carbon atoms and are aliphatic or cycloaliphatic, and R and $R^1$, when taken together, can be alkylene containing at least 3 carbon atoms, preferably propylene; tetramethylene; 1,5-pentylene; 1,6-hexylene; the hydroxy groups in the foregoing formula being substituted at any carbon atom of said R and $R^1$, and generally other than the $\alpha$ carbon atom, and preferbaly are substituted at the $\beta$ carbon position; $n$ and $n'$ being 0–2, and having a sum of 1–2.

When R and $R^1$ are aliphatic, it is preferred that they be lower-alkyl and when cycloaliphatic, it is preferred that they contain about 1–8 carbon atoms. Also included within the scope of this invention are hydroxy sulfoxides of the following formula:

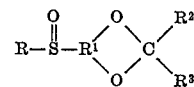

wherein R and $R^1$ are as defined above, with the excepttion that $R^1$ in this instance contains at least 2 adjacent carbon atoms to which the oxygens in the foregoing formula are attached, and $R^2$ and $R^3$ are alkyl, preferably lower-alkyl, and hydroxy sulfoxides having the following formula:

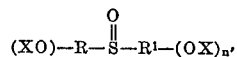

wherein R, $R^1$, $n$, and $n'$ are as defined above, and X is an acyl group preferably containing up to about 6 carbon atoms, such as acetyl, propionyl, butyryl, pentanoyl, and hexanoyl. The following compounds are illustrative: methyl hydroxyethyl sulfoxide acetonide, 3-hydroxy tetramethylene sulfoxide acetonide, methyl $\beta$-hydroxy isopropyl sulfoxide acetonide, methyl $\beta,\gamma$-dihydroxypropyl sulfoxide acetonide, methyl hydroxyethyl sulfoxide acetate, 3-hydroxy tetramethylene sulfoxide acetate, methyl $\beta$-hydroxy isopropyl sulfoxide acetate, methyl $\beta,\gamma$-dihydroxypropyl sulfoxide acetate.

The hydroxysulfoxides (or sulfinyl alcohols) of this invention may be prepared by controlled oxidation of the thio alcohols. Exemplary of the thio alcohol starting materials (which are herein named as sulfides for the sake of consistency) that can be employed are:

methyl $\beta$-hydroxyethyl sulfide;
ethyl $\beta$-hydroxyethyl sulfide;
butyl $\beta$-hydroxyethyl sulfide;
sec-butyl $\beta$-hydroxyethyl sulfide;
tertiaryl-butyl $\beta$-hydroxyethyl sulfide;
iso-amyl $\beta$-hydroxyethyl sulfide;
tertiary-amyl $\beta$-hydroxyethyl sulfide;
heptyl $\beta$-hydroxyethyl sulfide;
octyl $\beta$-hydroxyethyl sulfide;
methyl $\beta$-hydroxy isopropyl sulfide;
ethyl $\beta$-hydroxy isopropyl sulfide;
tertiary-butyl $\beta$-hydroxy isopropyl sulfide;
tertiary-amyl $\beta$-hydroxy isopropyl sulfide;
methyl $\gamma$-hydroxy propyl sulfide;
ethyl $\Delta$-hydroxy butyl sulfide;
propyl $\gamma$-hydroxy propyl sulfide;
butyl $\gamma$-hydroxy propyl sulfide;
amyl $\beta$-hydroxy propyl sulfide;
methyl $\beta$-hydroxy amyl sulfide;
di($\gamma$-hydroxy propyl) sulfide;
di-($\beta$-hydroxy propyl) sulfide;
di-($\beta$-hydroxy iso-amyl) sulfide;

β-hydroxy ethyl β-hydroxy propyl sulfide;
β-hydroxy ethyl γ-hydroxy propyl sulfide;
β-hydroxy ethyl Δ-hydroxy butyl sulfide;
β-hydroxy ethyl e-hydroxy amyl sulfide;
β-hydroxy iso-propyl γ-hydroxy propyl sulfide;
methyl 8-hydroxy n-octyl sulfide;
ethyl 6-hydroxy n-hexyl sulfide;
butyl Δ-hydroxy butyl sulfide and the like. Complete oxidation of the thio group in these compounds produces the sulfonyl derivatives, while partial controlled oxidation produces the corresponding sulfinyl alcohols.

The oxidation of the thio alcohols may be effected by any of a large number of oxidizing agents, such as peroxides, as hydrogen peroxide, sodium and potassium perbenzoates, permanganates, bromides, fuming nitric acid, chromic acid, and perbenzoic acid. The amount of the oxidizing agent to be employed will vary over a considerable range. If the sulfinyl alcohol is the desired product it is generally desirable to react the thio alcohol with an approximate chemical equivalent amount of the oxidizing agent. As used throughout the specification, the expression "chemical equivalent amount" refers to the amount of agent necessary to furnish one atom of oxygen for every thio ether linkage to be oxidized. Preferably, the thio alcohol and agent are reacted in chemical equivalent ratios of 1:1 to 1:1.5, respectively. The acetonide's derivatives of the hydroxy sulfoxides of this invention can be prepared by reacting the sulfinyl alcohol (i.e., glycol) or corresponding epoxide with the corresponding ketone, for example (e.g., acetone in the case of the acetonide), under anhydrous acid conditions. It is preferred, however, to prepare the acetonide from the dioxalane sulfide followed by oxidation as described above.

The oxidation may be accomplished in the presence or absence of solvents or diluents. Examples of suitable diluents are glacial acetic acid, benzene, toluene, xylene, and the like. The temperature employed during the oxidation may vary over a considerable range, depending upon the reactants and oxidizing agent employed. It is generally desirable to maintain the temperature between 50° C. and 150° C., preferably 60° C. and 100° C. Cooling may be employed if necessary. Atmospheric, superatmospheric, or subatmospheric pressures may be employed as desired. The sulfinyl alcohols in the reaction may be recovered by any suitable method, such as distillation, fractional precipitation, and the like. Thus, with reference to the sulfide starting materials set forth above, the corresponding sulfoxides are produced, to wit:

methyl β-hydroxyethyl sulfoxide;
ethyl β-hydroxyethyl sulfoxide;
butyl β-hydroxyethyl sulfoxide;
sec-butyl β-hydroxyethyl sulfoxide;
t-butyl β-hydroxyethyl sulfoxide;
iso-amyl β-hydroxyethyl sulfoxide;
t-amyl β-hydroxyethyl sulfoxide;
heptyl β-hydroxyethyl sulfoxide;
octyl β-hydroxyethyl sulfoxide;
methyl β-hydroxy isopropyl sulfoxide;
ethyl β-hydroxy isopropyl sulfoxide;
t-butyl β-hydroxy isopropyl sulfoxide;
t-amyl β-hydroxy isopropyl sulfoxide;
methyl γ-hydroxy propyl sulfoxide;
ethyl Δ-hydroxy butyl sulfoxide;
propyl γ-hydroxy propyl sulfoxide;
butyl γ-hydroxy propyl sulfoxide;
amyl β-hydroxy propyl sulfoxide;
methyl β-hydroxy amyl sulfoxide;
di-(γ-hydroxy propyl) sulfoxide;
di-(β-hydroxy propyl) sulfoxide;
di-(β-hydroxy isoamyl) sulfoxide;
β-hydroxy ethyl β-hydroxy propyl sulfoxide;
β-hydroxy ethyl γ-hydroxy propyl sulfoxide;
β-hydroxy ethyl Δ-hydroxy butyl sulfoxide;
β-hydroxy etheyl e-hydroxy amyl sulfoxide;
β-hydroxy isopropyl γ-hydroxy propyl sulfoxide;
methyl 8-hydroxy n-octyl sulfoxide;
ethyl-6-hydroxy n-hexyl sulfoxide;
butyl Δ-hydroxy butyl sulfoxide and the like.

A preferred embodiment of this invention is a method of treating a patient (animal or human) having a disease which is symtomatically characterized by pain, fever and/or inflammation which comprises the oral, parenteral, rectal or topical administration in dosage unit form of between about 0.01 and 5 gm. of the hydroxy sulfoxide per day. On a kilogram basis, it is preferred to utilize between about 0.5 mg./kg. and 70 mg./kg. per day of the hydroxy sulfoxides of this invention.

Another embodiment of this invention is the provision of pharmaceutical compositions in dosage unit form which comprise from about 5 to 500 mg., and preferably from 25 to 250 mg., of a hydroxy sulfoxide of the above formula. Methyl hydroxyethyl sulfoxide or β-hydroxy isopropyl methyl sulfoxide, in oral dosage unit form, comprising about 25 to about 500 mg. are preferred pharmaceutical compositions of this invention.

The sulfoxide compositions of this invention may be used to treat a wide variety of mammalian conditions where one or more of the symptoms of inflammation, fever and pain are manifested. Exemplary of such conditions are: rheumatic diseases, for example, rheumatoid arthritis, osteoarthritis and other degenerative joint diseases, psoriatic arthritis, ankylosing spondylitis, gout and rheumatic fever; soft-tissue rheumatism, e.g. tendinitis, perarthritis and and periostitis; acute muscular rheumatism, e.g. sciatica and the like; certain cases of malignant conditions (e.g. carcinomata, leukemia), thrombophlebitis, varicose ulcers, diabetes, infections and allergic responses thereto, treatment of pain after fractures, pain and inflammation associated with dental surgery, and the like, human and veterinary disease conditions exhibiting the foregoing symptoms requiring the use of an anti-inflammatory, analgesic and/or antipyretic pharmaceutical composition.

These and the other pharmaceutical compositions of this invention may be in a form suitable for oral use, for example, as tablets, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation.

Tablets contain the active sulfoxide ingredient in admixture with nontoxic pharmaceutically acceptable excipients which are suitable for manufacture of tablets. These excipients may be for example, inert diluents, for example, calcium carbonate, sodium carbonate, lactose, calcium phosphate or sodium phosphate; granulating and disintegrating agents, for example, maize starch, or alginic acid; binding agents, for example, starch, gelatin or acacia, and the lubricating agents, for example, magnesium stearate, stearic acid and talc. The tablets may be uncoated or they may be coated by known techniques to delay disintegration and absorption in the gastrointestinal tract and thereby provide a sustained action over a longer period.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with an oil medium, for example arachis oil, liquid paraffin or olive oil.

Since the hydroxy sulfoxides of this invention are generally water soluble, aqueous solutions containing the active sulfoxide form a prefered embodiment of this invention. Although in view of such water solubility it is not necessary to use excipients suitable for aqueous suspensions, such may be employed, if desired. These excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example, lecithin, or condensation products of an alkylene oxide with fatty acids, for example, polyoxyethylene stearate, or condensation products of ethylene oxide with long chain aliphatic alcohols, for example, heptadecaethyleneoxy-cetanol, or condensation products of ethylene oxide with partial esters derived from fatty acids and a hexitol, for example polyoxyethylene sorbitol monooleate, or condensation products of ethylene oxide with partial esters derived from fatty acids and hexitol anhydrides, for example, polyoxyethylene sorbitan monooleate. The said aqueous suspensions may also contain one or more preservatives, for example, ethyl, or n-propyl, p-hydroxy benzoate, one or more coloring agents, one or more flavoring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example, beeswax, hard paraffin or cetyl alcohol. Sweetening agents, such as those set forth above and flavoring agents made be added to provide a palatable oral preparation. These compositions may be preserved by the addition of an antioxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The pharmaceutical compositions of the invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally-occurring gums, for example, gum acacia or gum tragacanth, naturally-occurring phosphatides, for example, soya bean lecithin, and esters of partial esters derived from fatty acids and hexitol anhydrides, for example sorbitan mono-oleate, and condensation products of the said partial esters with ethylene oxide, for example, polyoxyethylene sorbitan mono-oleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents. The pharmaceutical compositions may be in the form of a sterile injectable preparation, for example, as a sterile injectable aqueous suspension. This suspension may be formulated according to the known art using those suitable dispersing or wetting agents and suspending agent which have been mentioned above. The sterile injectable preparation may also be a sterile injectable solution or suspension in a non-toxic parenterally-acceptable diluent or solvent, for example, as a solution in 1:3-butane diol.

The sulfoxide compositions of this invention may also be in the form of suppositories for rectal administration of the drug. These compositions can be prepared by mixing the drug with a suitable non-irritating excipient which is solid at ordinary temperatures, but liquid at the rectal temperature and will therefore melt in the rectum to release the drug. Such materials are cocoa butter and polyethylene glycols.

The pharmaceutical compositions may be tableted or otherwise formulated so that for exery 100 parts by weight of the composition there are present between 5 and 95 parts by weight of the active ingredient and preferably between 25 and 85 parts by weight of the active ingredient. The dosage unit form will generally contain between about 100 mg. and about 500 mg. of the active ingredient of the formula stated above.

From the foregoing formulation discussion it is apparent that the compositions of this invention can be administered orally, parenterally, topically and rectally. The term parenteral as used herein includes subcutaneous injection, intravenous, intramuscular, or intrasternal injection or infusion techniques.

The dosage regimen in carrying out the methods of this invention is that which insures maximum therapeutic response until improvement is obtained and thereafter is the minimum effective level which gives relief. Thus, in general, the dosages are those that are therapeutically effective in the treatment of disease conditions or symptoms, such as inflammation, pain and fever. In general, the daily dose can be between about 0.5 mg./kg. and 70 mg./kg., bearing in mind, of course, that in selecting the appropriate dosage in any specific case, consideration must be given to the patient's weight, general health, age and other factors which may influence response to the drug.

It is expected that the sulfoxide compositions of this invention will generally be administered in dosage units of between 5 and 500 mg. of active ingredient. Preferred compositions for ease of administration are in oral dosage unit form, e.g. tablets or capsules, containing between 25 and 500 mg. of a sulfoxide of this invention.

Although the foregoing discussion has been directed to methods for the treatment of anti-inflammatory conditions and to compositions therefor, as was stated at the beginning, the hydroxy sulfoxides of this invention have a wide range of other pharmaceutical uses.

For example, the foregoing sulfoxides can be employed in a tissue penetrant composition in combination with pharmaceutically active ingredients, which, alone or in pharmaceutical composition with pharmaceutically acceptable carriers, may not be capable of penetrating mammalian tissue or penetrate such tissue very poorly. The method of administering such penetrant compositions by contacting the tissue of a patient (animal or human) with effective amounts of the hydroxy substituted hydrocarbyl sulfoxides of this invention and the pharmaceutically active ingredient forms a related embodiment.

Further the active ingredient used with the sulfoxides of this invention in a tissue penetrant composition is not necessarily limited to one particular pharmacological effect. Thus, it may be directed to the treatment of a variety of disorders such as inflammation, pain, bacterial infection, dermatological conditions, etc.

The proportions of the various ingredients are relative and variations may be made to accommodate the desired viscosity, concentration of ingredients, rapidity of penetration or type of medicament involved.

The optimum quantities of the active ingredient and topical dosages of this invention will depend, of course, on the particular composition being used, the effectiveness of the active ingredient, the type and severity of disease condition being treated, the sensitivity of the patient and the response elicited and the form of penetrant composition.

The penetrant composition may be in the form of a paste, ointment, cream, gel, liquid, etc. and may be applied by any of the techniques known in the art.

Another embodiment of this invention relates to the use of the sulfoxide compositions of this invention as cryoprotective agents in order to maintain the viability of frozen animal cells. These hydroxy sulfoxide compositions are useful as cryoprotectants due to their cryoprotective characteristics and their ability to penetrate tissue. Hydroxy sulfoxide solutions of varying concentrations may be used depending on the tissue desired to be protected, the temperature of administration, the temperature to which the tissue is cooled, and the duration of exposure. For example, 10% (v./v.) aqueous solutions of hydroxy sulfoxides such as methyl hydroxyethyl sulfoxide, 3-hydroxy tetramethylene sulfoxide, methyl β-hydroxy isopropyl sulfoxide, and the other sulfoxides of this invention are effective in the protection of most tissues such as erythrocytes, leukocytes, renal cells, uterus and heart cells.

Another use relates to compositions and methods for reducing perspiration and also relates to increasing the activity of conventional antiperspirants; therefore, within the scope of this invention is the incorporation of known metallic salt astringents with a sulfoxide of this invention, thereafter contacting such composition with mammalian tissue containing sweat glands. Exemplary of such metallic salt astringents are zirconium lactate, zinc phenol sulfonate, aluminum chloride hydrate, aluminum hydroxide dichloride hydrate, aluminum phosphate, aluminum phenol sulfonate, aluminum sulfonate and like metallic salts with astringent action. The cosmetic bases may include the usual cream, the lotion form, the emulsion form, the propellant form and the powder form where a complex of aluminum salts with a hydroxy substituted hydrocarbyl sulfoxide of this invention is used. A related embodiment is the method for potentiating anti-perspirant activity of metallic salts having astringent activity, which comprises the steps of contacting mammalian tissue containing sweat glands with a metallic salt having astringent activity and an effective amount of a hydroxy sulfoxide of this invention. In addition, a method for reducing perspiration in those areas of mammal tissue having sweat glands includes the steps of contacting the said mammal tissue with an aluminum chloride hexadimethyl sulfoxide complex in a cosmetically acceptable carrier. Also included within the scope of this embodiment is an anti-perspirant method for topical administration of a metallic salt having astringent activity with up to about 50% by weight of a sulfoxide of this invention and a cosmetically acceptable carrier.

The hydroxy substituted sulfoxides of this invention relieve respiratory condition symptoms, such as those attendant to the common cold, sinusitus and hay fever and the like conditions symptomatically evidenced by neuritis, neuralgia, etc. Therefore, another embodiment of this invention comprises a method of relieving respiratory distress, which comprises administering to a mammal, in unit dosage form, a pharmaceutically acceptable composition containing a therapeutically effective amount of a hydroxy substituted sulfoxide of this invention. Administration may be oral or by injection, but it is preferred to utilize topical administration at a site normally evidencing symptoms of respiratory distress, for example, the nasal membranes. The compositions of this embodiment are generally administered in unit dosage forms determined by the general medical experience of the practitioner, but in general, will range up to 100% concentration. When administered in more dilute form, generally accepted diluents, such as sterile water and the like liquid carriers in which the sulfoxides of this invention are soluble, can be utilized. Although liquid carriers are preferred for topical administration, it, of course, is also possible to apply the sulfoxides as ointments and creams, using pharmaceutically acceptable ointment and cream bases. Generally, concentrations range in weight from about 25% to 100% of the sulfoxide, but usually no more than about 50% concentrations are employed. (Concentrations are by weight.)

Another embodiment of this invention comprises compositions suitable for inducing diuresis, which comprises therapeutically effective amounts of the sulfoxides of this invention and methods for administration of such diuretic compositions. The administration of effective amounts of the hydroxy substituted sulfoxides of this invention produced diuresis in mammals. Administration may be parenteral, oral or topical—in the latter case, application is to a situs from which the sulfoxide can easily be absorbed into the vascular system, preferably an area rich in blood vessels to effectuate rapid absorption of the sulfoxide active ingredient. For the purposes of this embodiment, the active sulfoxides may be formulated in a wide variety of pharmaceutically acceptable compositions, such as creams, ointments, lotions, suppositories, sprays, solutions and the like, as discussed more fully hereinbefore. Such formulations generally contain up to about 50% by weight of the active ingredient, however, the actual amount administered will be dependent upon the general experience of the practitioner and the response of the patient to the drug.

In addition to the foregoing effects of the pharmaceutical compositions incorporating the active sulfoxides of this invention, these compositions also control the growth of microorganisms, such as viral growth, bacterial growth and fungal growth. Thus, another embodiment of this invention comprises methods for the control of microorganism growth by applying effective amounts of the hydroxy substituted sulfoxides of this invention. Application of such effective amounts retards and/or stops growth, depending upon the concentrations employed, of microorganisms during the culturing period. Thus, the compositions of this invention have application generally in slimicide control for industrial purposes, such as treatment and control of microorganisms encountered in the paper and textile industry and also those encountered in the chemical industry, such as recycled water for the purposes of cooling, and even in the air-conditioning industry relative to recycled water in air-conditioner units.

Another embodiment comprises combining of the sulfoxides of this invention with biocides and biostats to result in a potentiated increased effectiveness of such biocidal and biostatic agents. Furthermore in this regard, the sulfoxides of this invention, in certain instances, can be utilized to decrease and/or eliminate the resistance of previously resistant strains of microorganisms, so that previously ineffective antimicrobials can be utilized. This aspect of the instant invention relates to a wide variety of microorganisms, including bacteria, fungi, yeasts, viruses and reickettsia.

Another embodiment of this invention comprises a method for producing muscle relaxation, including muscles stimulated by the parasympathetic division of the autonomic nervous system, as well as skeletal muscles, by the administration of a sulfoxide of this invention. Included within the scope of this embodiment is the use of said sulfoxides as an antispasmodic, vasodilator and anticonvulsant. Administration of such compositions containing the sulfoxide in the pharmaceutically effective dosage form induces skeletal muscle relaxation, involuntary nerve control, relief of cramps, relief of hyperkinetic disorders, relief of the symptoms of Parkinson's Disease, and the like muscle related disorders. Administration preferably is topical and to the site in need of relief.

Another embodiment of this invention relates to the use of the sulfoxide compositions of this invention for the treatment of a wide variety of vascular disorders by the administration to a mammal exhibiting the symptoms of vascular insufficiency, of an effective amount of the active sulfoxides of this invention. The term "vascular insufficiency" as employed herein, refers to a circulatory vessel disorder, which results in a deficiency relative to the vessels conveyance of normal amounts of fluid, arising from both organic and functional causative origins.

Also an embodiment of this invention is a method for treatment of burns, which comprises administering to the situs of the burned tissue an effective amount of a sulfoxide of this invention. Also included within the scope of this embodiment is a process for promoting the healing of skin grafts by the contact with the situs thereof of an effective amount of the active sulfoxides of this invention.

This invention is further demonstrated by the following examples in which all parts are by weight.

EXAMPLE 1

Methyl gamma-hydroxypropyl sulfoxide

To a mixture of 17.6 grams (0.165 mole) of methyl gamma-hydroxypropyl sulfide in 75 ml. of water which has been cooled to 5° is added dropwise 17.0 ml. of 30% hydrogen peroxide (0.165 mole); the temperature of the reaction mixture is kept at 5° to 10° C. during the addition and then the mixture is stirred for 2 hours at room temperature. Th ereaction mixture is concentrated in vacuo and the residue (20 g.) absorbed onto 25 g. of silica gel and chromatographed on 600 g. of silica gel and elution with 25% acetone in methylene chloride to yield methyl gamma-hydroxypropyl sulfoxide.

EXAMPLE 2

2,2-dimethyl-4-methylsulfinylmethyl-1,3-dioxolane

To 210 ml. of a 0.5 mole of solution (0.105 mole) of sodium metaperiodate at 0° is added 16.1 grams (0.1 mole) of 2,2-dimethyl-4-methylthiomethyl-1,3-dioxolane. The reaction mixture is stirred overnight at 0° to 5° C. The precipitated sodium iodate is removed by filtration and the filtrate extracted well with chloroform. The combined chloroform extracts are dried over sodium sulfate and concentrated in vacuo. The residue is chromatographed on 500 g. of silica gel and eluted with methanol-methylene chloride (0 to 10%) to give pure 2,2-dimethyl-4-methylsulfinylmethyl-1,3-dioxolane.

EXAMPLE 3

A mixture of 250 parts of methyl β-hydroxyethyl sulThe reaction mixture is stirred overnight at 0° to 5° C. water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The methyl β-hydroxyethyl sulfoxide used in the foregoing example may be replaced by 25, 100, or 500 parts of ethyl β-hydroxyethyl sulfoxide, butyl β-hydroxyethyl sulfoxide, octyl β-hydroxyethyl sulfoxide, methyl β-hydroxyethyl sulfoxide, and the like sulfoxides of this invention to produce tablets suitable for oral administration according to the methods of this invention.

EXAMPLE 4

A mixture of 50 parts of 3-hydroxy tetramethylene sulfoxide, 3 parts of the calcium salt of lignin sulphonic acid, and 237 parts of water is ball-milled until the size of substantially all of the particles of the sulfoxide is less than 10 microns. The suspension is diluted with a solution containing 3 parts of sodium carboxymethyl cellulose and 0.9 part of the butyl ester of p-hydroxybenzoic acid in 300 parts of water. There is thus obtained an aqueous suspension suitable for oral administration for therapeutic purposes.

EXAMPLE 5

A mixture of 250 parts of ethyl β-hydroxyethyl sulfoxide, 200 parts of maize starch and 30 parts of alginic acid is mixed with a sufficient quantity of a 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 6

A mixture of 50 parts β-hydroxy isopropyl methyl sulfoxide, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 7

A mixture of 25 parts of butyl β-hydroxyethyl sulfoxide, 30 parts of sucrose, 0.5 part of acetyl alcohol polyethylene oxide condensate, 1 part of polyvinyl pyrrolidone, 0.25 part of methyl p-hydroxybenzoate and 100 parts of water is ball milled for several hours. After the incorporation of suitable coloring and flavoring agents, there is obtained an aqueous suspension suitable for oral administration for therapeutic purposes.

EXAMPLE 8

5 parts of 4-hydroxy cyclohexyl methyl sulfoxide in a finely divided form are mixed with 12 parts of powdered gum acacia, 0.8 part of powdered tragacanth and 0.4 part of elixir saccharin, and the whole is mixed with 50 parts of arachis oil. The oily suspension is then mixed with 50 parts of water and there is thus obtained an emulsion suitable for oral administration.

EXAMPLE 9

The preparation of a tissue penetrant composition is accomplished by the following procedures:

Anti-inflammatory gel.—70 grams of hydrated lanolin is melted and agitated vigorously with 30 g. of methyl β-hydroxyethyl sulfoxide which was previously hydrated to about 10%. On cooling, the mixture congeals without syneresis.

To 90 g. of the methyl β-hydroxyethyl sulfoxide-lanolin composition is added 1.0 g. of indomethacin and this is vigorously agitated to form a homogenized gel.

The gel is then administered to the tissue to be treated by applying approximately 2.5 g./day.

When a composition is desired which will contain a lower or higher concentration of indomethacin the proportion of each of the ingredients are adjusted accordingly.

When the active ingredient of the above example is replaced by the medicinal agents of Table I below, the corresponding composition is obtained. Appropriate concentrations by weight of the medicaments are shown.

TABLE I

| | Percent by wt. |
|---|---|
| Betamethasone | 0.2 |
| Dexamethasone-sodium phosphate | 0.05–0.1 |
| Fluorocortisone acetate | 0.05–0.25 |
| Flucinolone acetonide | 0.01–0.025 |
| Fluorometholone | 0.025 |
| Hydrocortamate | 0.5 |
| Hydrocortisone | 1–2.5 |
| Hydrocortisone acetate | 0.5–2.5 |
| Indomethacin | 0.1–5.0 |
| Methylprednisolone acetate | 0.25–1.0 |
| Prednisolone | 0.5 |
| Triamcinolone | 0.5–1.0 |
| Triamcinolone acetonide | 0.1–0.5 |
| Fluandrenolone | 0.05 |

Analgesic ointment.—To 20 grams of wheat starch and 22 grams of water mixed on a steam bath are added 150 grams of 3-hydroxy tetramethylene sulfoxide and 20 grams of glycerine. Heating is continued until complete homogenation of the media occurs. On cooling, a homogenous ointment is obtained.

To 90 g. of this ointment is blended 7 grams of 3-hydroxy tetramethylene sulfoxide and 3 grams of lidocaine until a homogenous composition is obtained.

The ointment is then applied to the tissue to be treated in the usual manner.

Anti-bacterial solutions.—50 mg. of Polymyxin B Sulfate is dissolved in 25 g. of methyl β-hydroxyisopropyl sulfoxide to produce a 0.05% topical solution.

The above solution may be applied in the form of a wet dressing to the tissue to be treated.

When the sulfoxide carrier in the above examples is replaced by the sulfoxides of Table II below, the corresponding medicinal composition is obtained.

TABLE II

Methyl β-hydroxyethyl sulfoxide
Ethyl β-hydroxyethyl sulfoxide
Butyl β-hydroxyethyl sulfoxide
Sec-butyl β-hydroxyethyl sulfoxide,
t-Butyl β-hydroxyethyl sulfoxide
Iso-amyl β-hydroxyethyl sulfoxide
t-Amyl β-hydroxyethyl sulfoxide
Heptyl β-hydroxyethyl sulfoxide
Octyl β-hydroxyethyl sulfoxide
Methyl β-hyroxy isopropyl sulfoxide
Ethyl β-hydroxy isopropyl sulfoxide
t-Butyl β-hydroxy isopropyl sulfoxide
t-Amyl β-hydroxy isopropyl sulfoxide
Methyl γ-hydroxy propyl sulfoxide
Ethyl Δ-hydroxy butyl sulfoxide
Propyl γ-hydroxy propyl sulfoxide
Butyl γ-hydroxyl propyl sulfoxide
Amyl β-hydroxy propyl sulfoxide
Methyl β-hydroxy amyl sulfoxide
Di-(γ-hydroxy propyl) sulfoxide
Di-(β-hydroxy propyl) sulfoxide
Di-(β-hydroxy isoamyl) sulfoxide
β-Hydroxy ethyl β-hydroxy propyl sulfoxide
β-Hydroxy ethyl γ-hydroxy propyl sulfoxide
β-Hydroxy ethyl Δ-hydroxy butyl sulfoxide
β-Hydroxy ethyl e-hydroxy amyl sulfoxide
β-Hydroxy isopropyl γ-hydroxy propyl sulfoxide
Methyl 8-hydroxy n-octyl sulfoxide
Ethyl 6-hydroxy n-hexyl sulfoxide
Butyl Δ-hydroxy butyl sulfoxide and the like.

Various other binding agents and fillers known to one skilled in the art may be employed in a conventional manner.

What is claimed is:

1. A method of treating at least one of the symptoms of pain, fever and inflammation, which comprises the parenteral, rectal or oral administration in dosage unit form to a host afflicted with this symptom of a pharmaceutically acceptable compound consisting essentially of a therapeutically effective analgesic, antipyretic and anti-inflammatory amount of a compound of the formula:

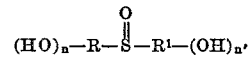

wherein R and R' are taken together and are each alkylene containing between about 3 and 8 carbon atoms, and $n$ and $n'$ are 0–1, $n+n'$ being 1–2; wherein said effective analgesic, antipyretic and anti-inflammatory amount is between 0.5 mg. to 70 mg./kg.

2. The method of claim 1 wherein R and R' taken together are propylene, tetramethylene, 1,5-pentylene or 1,6-hexylene.

3. The method of claim 2 wherein said compound is 3-hydroxy tetramethylene sulfoxide.

References Cited

UNITED STATES PATENTS 3,098,793  7/1963  Loev _____ 424—275 X
3,564,095  2/1971  Sarett et al. _____ 424—275
3,527,864  9/1970  Kilmer-MacMillan et al.
                                    424—243 X
3,678,156  7/1972  Kilmer-MacMillan et al.
                                    424—337 X

OTHER REFERENCES

Roberts et al., Nature 184 (4695):1288–1289, Oct. 24, 1959 "Metabolic and Chemical Studies of 'Mylgran': Formation of 3-hydroxytetrahydrothiophene-1,1, dioxide in vivo."

Alexander et al. Arch. Int. Pharmacodyn, 119:423–434 (1959) "Pharmacology of Some Monohalogenated Derivatives of Sulfolane (Tetrahydrothiophene-1,1-dioxide)."

SHEP K. ROSE, Primary Examiner

U.S. Cl. X.R.

260—327 PY, 332.3, 338, 340.7, 340.9, 488, 607 A; 424—337